(12) United States Patent
Lisi et al.

(10) Patent No.: US 9,831,684 B2
(45) Date of Patent: Nov. 28, 2017

(54) ADAPTIVE RECTIFIER AND METHOD OF OPERATION

(71) Applicant: Texas Instruments Incorporated, Dallas, TX (US)

(72) Inventors: Gianpaolo Lisi, Los Gatos, CA (US); Nachiket V. Desai, Cambridge, MA (US); Sakshi Arora, San Jose, CA (US); Rajaram Subramonian, Cupertino, CA (US); Gerard Socci, Palo Alto, CA (US); Dingkun Du, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 184 days.

(21) Appl. No.: 14/657,685

(22) Filed: Mar. 13, 2015

(65) Prior Publication Data
US 2016/0043562 A1  Feb. 11, 2016

Related U.S. Application Data

(60) Provisional application No. 62/035,063, filed on Aug. 8, 2014.

(51) Int. Cl.
*H02J 5/00* (2016.01)
*H02J 50/12* (2016.01)

(52) U.S. Cl.
CPC .............. *H02J 5/005* (2013.01); *H02J 50/12* (2016.02)

(58) Field of Classification Search
CPC .. H02J 17/00; H02J 5/005; H02J 7/025; H02J 50/12
USPC .......................................................... 307/104
See application file for complete search history.

(56) References Cited

U.S. PATENT DOCUMENTS

| | | | | |
|---|---|---|---|---|
| 2007/0109708 A1* | 5/2007 | Hussman | .................. | H02J 1/00 361/113 |
| 2013/0058379 A1* | 3/2013 | Kim | ..................... | H04B 5/0031 375/146 |
| 2013/0082536 A1* | 4/2013 | Taylor | ..................... | H02J 7/025 307/104 |
| 2014/0203659 A1* | 7/2014 | Madawala | ........... | H04B 5/0075 307/104 |
| 2015/0311827 A1* | 10/2015 | Villalobos | ............... | H02J 7/025 320/108 |

OTHER PUBLICATIONS

Berger, Andreas; Agostinelli, Matteo; Vesti, Sanna; Oliver, Jesus A.; Cobos, Jose A.; Huemer, Mario; "A Wireless Charging System Applying Phase-Shift and Amplitude Control to Maximize Efficiency and Extractable Power," 2015 IEEETransactions on Power Electronics, 11 pages.

* cited by examiner

*Primary Examiner* — Robert Deberadinis
(74) *Attorney, Agent, or Firm* — Michael A. Davis, Jr.; Charles A. Brill; Frank D. Cimino

(57) ABSTRACT

A wireless power transfer system includes a wireless power receiver having a rectifier. The rectifier includes switches. The wireless power receiver is operable to control the switches for ensuring a complex impedance at the input of the rectifier.

18 Claims, 7 Drawing Sheets

902 — CONTROLLING, BY CONTROL CIRCUITRY IN A WIRELESS POWER RECEIVER, SWITCHES IN A RECTIFIER, TO ENSURE A COMPLEX IMPEDANCE AT THE INPUT OF THE RECEIVER

ADAPTIVE RECTIFIER AND METHOD OF OPERATION

CROSS-REFERENCE TO RELATED APPLICATION

This application claims priority to U.S. Provisional Patent Application Ser. No. 62/035,063 filed Aug. 8, 2014, entitled "Adaptive Rectifier For A Wirelessly-Powered Device", which is hereby incorporated by reference.

BACKGROUND

Many power circuits, such as DC-DC converters and DC/AC converters, use resonant power conversion. In the simplest configuration, electronic switches drive a resonant inductive-capacitive (L-C) tank circuit that is transformer coupled to a rectifier and a load. Typically, the L-C resonant circuit is excited at an operating frequency and various inefficiencies result if the L-C resonant frequency is different than a specific desired value. Various ways of actively tuning a resonant circuit are possible, but tuning capability typically adds complexity and cost.

One example system that typically uses resonant power conversion is wireless power transfer. Wireless power transfer is useful for charging batteries. For example, wireless charging holders (or docks, or mats) exist for electric toothbrushes, cell phones and other consumer electronics, construction equipment (such as saws and drills), and industrial scientific medical (ISM) devices. Typically, a power transmitting device (source) includes a primary transformer coil, a power receiving device includes a secondary transformer coil, and the two coils are placed in close proximity for charging. Power is inductively coupled from the power transmitter to the power receiver through the resulting transformer. Multiple coils in the power transmitter and/or power receiver may facilitate X and Y spatial freedom. One power transmitter may provide power for multiple power receivers.

ISM devices commonly use standard RF frequencies that are dedicated to ISM, with strict out-of-band emission requirements. Accordingly, ISM wireless power transmitters and receivers commonly operate at a fixed frequency. Typically, ISM wireless power transmitters include a DC/DC converter that drives a DC/AC converter, where the DC-AC converter output is at a constant standard ISM frequency. Power is controlled by controlling the output of the DC-DC converter in the power transmitter.

Wireless power transfer systems may also include wireless communication from the power receiver to the power transmitter. For example, the power receiver may need to communicate battery level, or may need to communicate a need for trickle charging, or deep cycle recharging. Wireless power receivers may include separate wireless communication ability (such as, Bluetooth low energy (BLE)), and wireless power transmitters may also include compatible separate wireless communication ability to receive information from the power receivers.

FIG. 1 shows an example of a conventional wireless power transfer system 100, which includes a power transmitter 102 and a power receiver 104. The power transmitter 102 includes a primary coil 106 and the power receiver 104 includes a secondary coil 108.

The example power transmitter 102 includes a DC/DC converter 110 and a DC/AC converter 112. The DC/AC converter 112 drives the primary coil 106 at a frequency that may be variable or fixed, and in particular may be a fixed standard ISM frequency. A controller 114 controls power output by controlling the output of the DC/DC converter 110.

The example power receiver 104 includes a rectifier 116, a charger 118, and a battery 120. Typically, the rectifier 116 is a diode full-wave rectifier and the charger 118 is a DC/DC converter, such as a buck converter (whose output voltage is lower than its input voltage). The example power receiver 104 also includes a BLE communication device 122, which wirelessly transmits control information to a BLE communication device 124 in the power transmitter 102.

SUMMARY

A wireless power transfer system includes a wireless power receiver having a rectifier. The rectifier includes switches. The wireless power receiver is operable to control the switches for ensuring complex impedance at an input of the rectifier.

DETAILED DESCRIPTION

In the following example embodiments, an adaptive rectifier has two different example functions within resonant power conversion systems. For each function, the adaptive rectifier is operated in a manner that ensures a complex impedance at an input of the adaptive rectifier. In one example function, an adaptive rectifier is used instead of a diode rectifier on the receiver side of a wireless power transfer system. In a second example function, an adaptive rectifier acts as a variable reactance to tune a resonant circuit, which (in at least one example) may be on the transmitter side of a wireless power transfer system. In both example functions, the variable reactance of the adaptive rectifier provides numerous system benefits.

Also in the example embodiments, a wireless power transfer system has the following attributes: (a) fewer system functional modules, resulting in reduced cost and reduced die size; (b) capability of bidirectional power transfer; (c) adaptive tuning enabling control or optimization of multiple system parameters; (d) capability of communication from a wireless receiver to a wireless transmitter without separate wireless communication modules, and (e) overvoltage protection.

Figure 2:
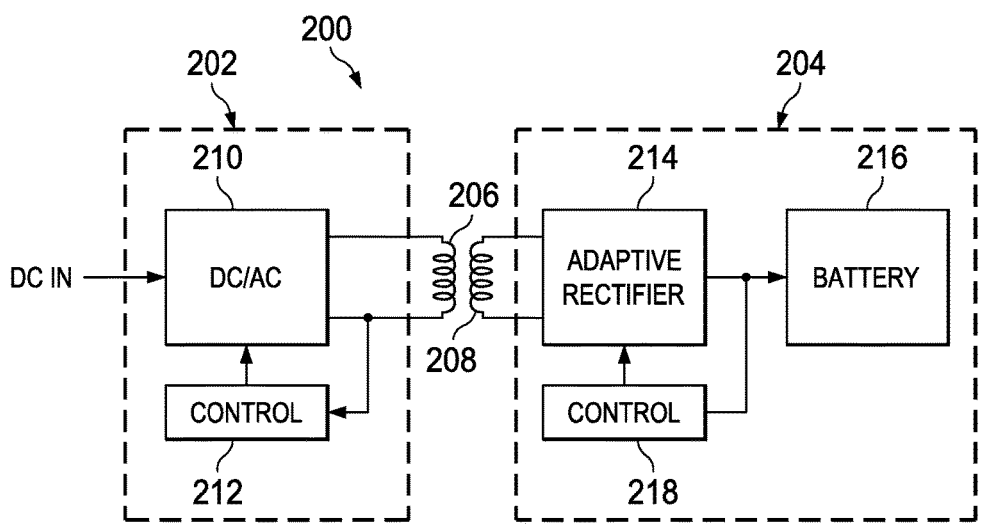
FIG. 2 is a block diagram schematic of an example embodiment illustrating an improved wireless power transfer system.

FIG. 2 shows an example embodiment of an improved wireless power transfer system 200, including a power transmitter 202 and a power receiver 204. The power transmitter 202 includes a primary coil 206 and the power receiver 204 includes a secondary coil 208. The power transmitter 202 includes a DC/AC converter 210 and a controller 212. In some embodiments the system 200 is an ISM system and the DC/AC converter 210 drives the primary coil 206 at a fixed ISM standard frequency. The power receiver 204 includes an adaptive rectifier 214, a battery 216, and a controller 218.

Figure 1:
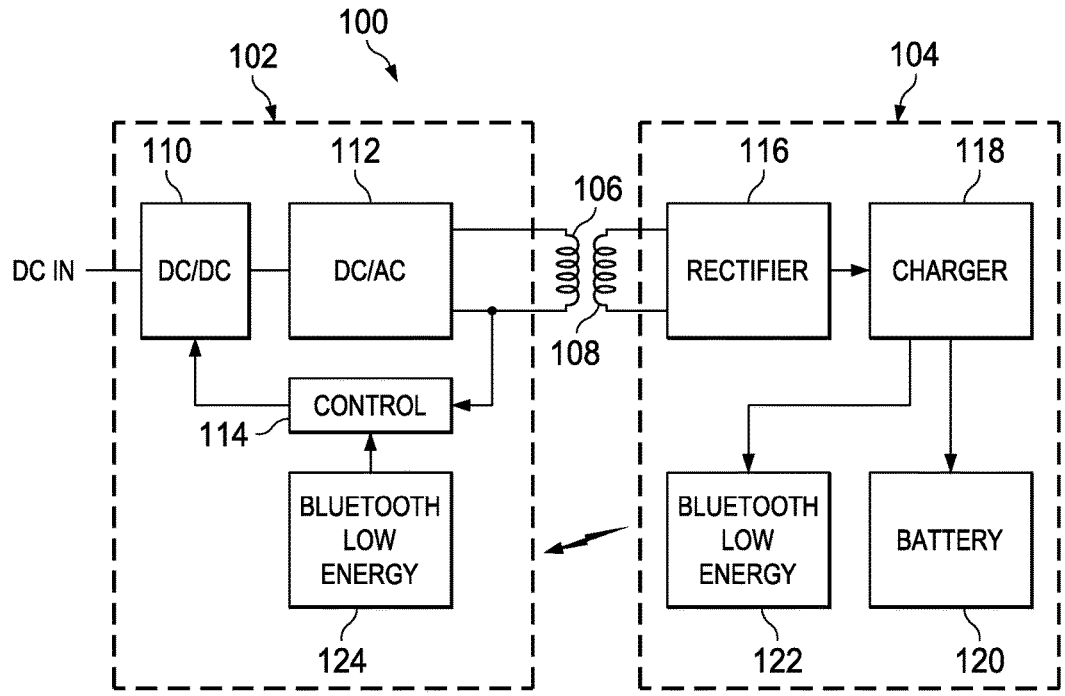
FIG. 1 is a block diagram schematic of an example embodiment of a conventional wireless power transfer system.

Comparing the power transmitter 202 in FIG. 2 to the power transmitter 102 in FIG. 1, the DC/DC converter (FIG. 1, 110) and the BLE communications module (FIG. 1, 124) have been eliminated. Likewise, comparing the power receiver 204 in FIG. 2 to the power receiver 104 in FIG. 1, the charger (FIG. 1, 118) has been eliminated. In addition, in the example power receiver 204 in FIG. 2 there is no BLE module (FIG. 1, 122). The power receiver 204 in FIG. 2 may include a BLE module for other purposes, but a BLE module is unnecessary for dedicated communication from the power receiver 204 to the power transmitter 202.

Figure 3A:
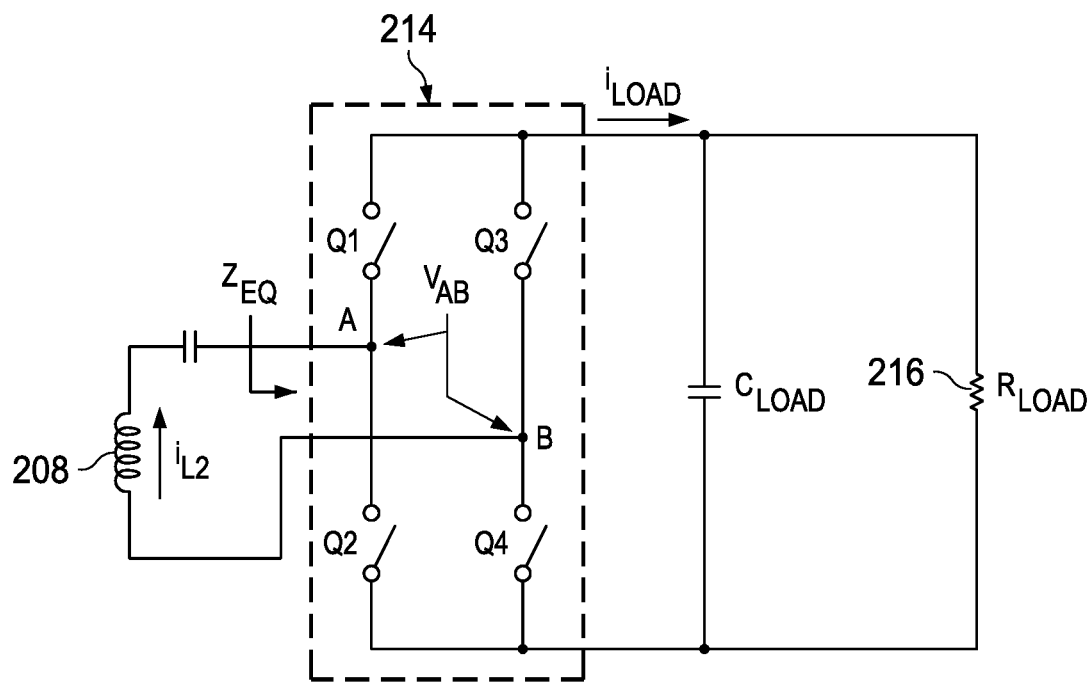
FIG. 3A is a block diagram schematic illustrating additional detail for part of the wireless power receiver of FIG. 2.

FIG. 3A shows additional detail (simplified to facilitate discussion and illustration) for part of the power receiver 204 of FIG. 2. In the example of FIG. 3A, the adaptive rectifier 214 includes four transistor switches (Q1, Q2, Q3, and Q4). By controlling the states of the switches the circuit acts as a rectifier. In FIG. 3A and in the following discussion, the battery 216 is shown as a resistive load $R_{load}$.

3B-3D show example current paths of the secondary coil current $i_{L2}$ for various states of the switches Q1-Q4 in FIG. 3A.

Figure 4A:
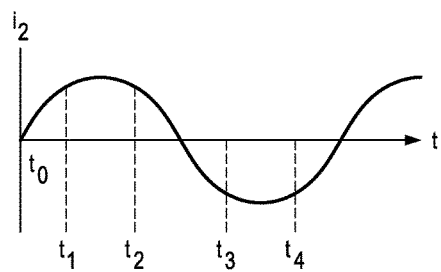
FIG. 4A is a timing diagram of the current through a secondary transformer for the wireless power transfer system of 2 and 3A.

FIG. 4A shows the secondary coil current $i_{L2}$ as a function of time.

Figure 4B:
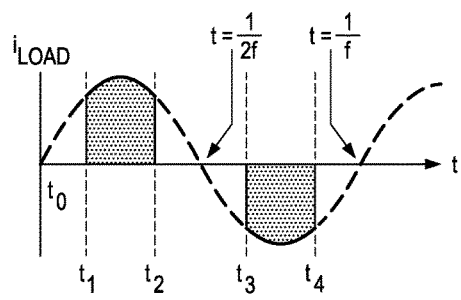
FIG. 4B is a timing diagram of an example of the current to the load when using the adaptive rectifier of FIG. 3A.

FIG. 4B shows an example of the current $i_{load}$ at the output of the adaptive rectifier 214, which is the current through the parallel combination of the output capacitor $C_{load}$ and the output resistive load $R_{load}$. For each state of the switches Q1-Q4 discussed in conjunction with FIG. 4B, the resulting current paths are discussed in conjunction with 3B-3D.

Figure 3B:
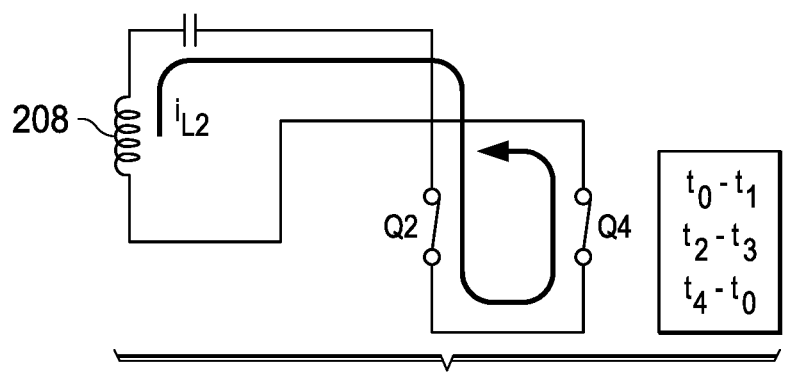
FIGS. 3B, 3C and 3D are block diagrams of current paths of the circuit of FIG. 3A.
Figure 3C:
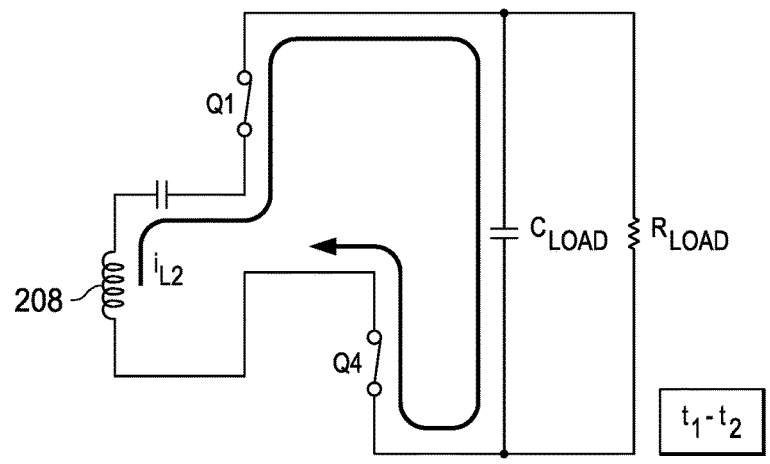
Figure 3D:
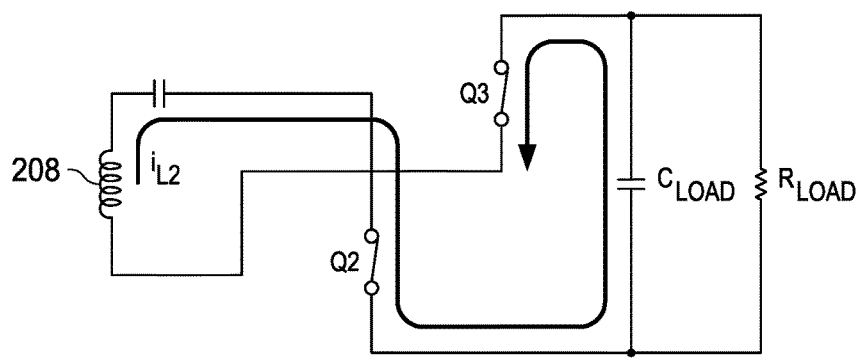

In FIG. 4B, at time $t_0$, switches Q2 and Q4 are ON and switches Q1 and Q3 are off. As shown in FIG. 3B, the secondary coil current $i_{L2}$ circulates through switches Q2 and Q4 and no current flows at the output of the adaptive rectifier 214 (so no current flows through the parallel combination of the output capacitor $C_{load}$ and the output resistive load $R_{load}$). At time $t_1$, switch Q2 is turned OFF, and switch Q1 is turned ON. As shown in FIG. 3C, the secondary coil current $i_{L2}$ circulates through switches Q1 and Q4 and current $i_{load}$ flows through the parallel combination of the output capacitor $C_{load}$ and the output resistive load $R_{load}$. At time $t_2$, switch Q1 is turned OFF and switch Q2 is turned ON. As shown in FIG. 3B, the secondary coil current $i_{L2}$ circulates through switches Q2 and Q4 and no current flows at the output of the adaptive rectifier 214 (so no current flows through the parallel combination of the output capacitor $C_{load}$ and the output resistive load $R_{load}$). At time $t_3$, switch Q4 is turned OFF and switch Q3 is turned ON. As shown in FIG. 3D, the secondary coil current $i_{L2}$ circulates through switches Q2 and Q3 and current $i_{load}$ flows through the parallel combination of the output capacitor $C_{load}$ and the output resistive load $R_{load}$. At time $t_4$, switch Q3 is turned OFF and switch Q4 is turned ON, and the state is the same as discussed for time $t_0$. In FIG. 4B, the rectifier output current $i_{load}$ flows through the parallel combination of the output capacitor $C_{load}$ and the output resistive load $R_{load}$ during the time interval from $t_1$ to $t_2$ and during the time interval from $t_3$ to $t_4$, as shown by the cross-hatched areas.

Figure 4C:
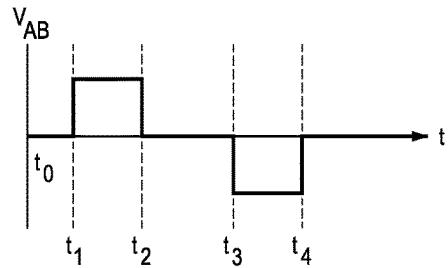
FIG. 4C is a timing diagram of the voltage induced at the input of the adaptive rectifier of FIG. 3A when the load current is as shown in FIG. 4B.

FIG. 4C shows the voltage $V_{AB}$ induced at the input to the adaptive rectifier 214 resulting from controlling the switches Q1-Q4 as discussed in conjunction with FIG. 4B. As shown in FIG. 4C, the voltage $V_{AB}$ induced at the input of the adaptive rectifier 214 is a three-level step-wise waveform having a fundamental component having the same frequency as the secondary coil current $i_{L2}$ and having an amplitude and phase that depend on the timing of $t_1$, $t_2$, $t_3$, and $t_4$.

In a conventional wireless power receiver with a diode rectifier, or with a synchronous rectifier, the input impedance of the rectifier is real (resistive). In contrast, the adaptive rectifier 214 is operated in a way that ensures a complex impedance at the input of the adaptive rectifier 214. In particular, a resistive load can be transformed into a complex load with variable phase and amplitude. As discussed in more detail below, multiple benefits result from operating the adaptive rectifier 214 to ensure adjustable and complex impedance $Z_{eq}$. In particular, a variable complex input impedance enables a capability for bidirectional power transfer, enables control and/or optimization of two different system parameters, and enables communication from a wireless receiver to a wireless transmitter.

For a first special case where $t_3=1/(2f)+t_1$, $t_4=1/(2f)+t_2$, $0<t_1<t_2<1/(2f)$, and f is the frequency of the secondary coil current $i_{L2}$, the fundamental component of $V_{AB}$ is:

$$V_{AB}=V_{out}*(4/\pi)*(t_2-t_1)*2*f*\sin[\omega*t+\text{phase}(i_{L2})+(\pi-\omega*(t_2-t_1))/2]$$

The input impedance $Z_{eq}$ of the adaptive rectifier 214 is then calculated by dividing $V_{AB}$ by $i_{L2}$. For the first special case, if $t_1>(1/(2f)-t_2)$, then the input impedance $Z_{eq}$ can be represented by a resistor and a capacitor connected in parallel.

FIG. 4B shows an example of the first special case, where $t_1=(1/(2f)-t_2)$. In this case, the voltage $V_{AB}$ at the input of the adaptive rectifier 214 is in phase with the secondary coil current $i_{L2}$, which results in the input impedance $Z_{eq}$ being real. Alternatively, switches Q1-Q4 can be operated to ensure that the phase of the voltage $V_{AB}$ induced at the input of the adaptive rectifier 214 is shifted relative to the phase of the secondary coil current $i_{L2}$, which results in the input impedance $Z_{eq}$ being complex.

Figure 4D:
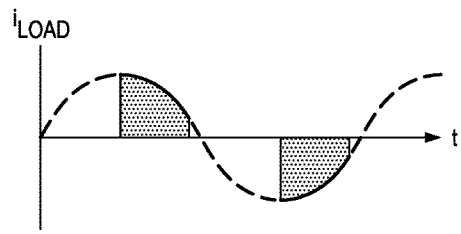
FIG. 4D is a timing diagram of an alternative example of the current to the load when using the adaptive rectifier of FIG. 3A.

FIG. 4D shows an alternative example of the load current $i_{load}$ at the output of the adaptive rectifier 214. FIG. 4D shows an example in which the phase of the voltage $V_{AB}$ at the input of the adaptive rectifier 214 is different from the phase of the secondary coil current $i_{L2}$, resulting in a complex input impedance $Z_{eq}$.

One benefit of a complex impedance is the capability for bidirectional power transfer. For a second special case where $t_3=1/(2f)+t_1$, $t_4=1/(2f)+t_2$, and $1/(2f)<t_1<t_2<1/f$, the fundamental component of $V_{AB}$ is:

$$V_{AB}=V_{out}*(4/\pi)*(t_2-t_1)*2*f*\sin\,[\omega*t+\text{phase}(i_{L2})+(\pi-\omega*(t_2-t_1))/2]$$

For the second special case, if $(t_1-1/(2f))>(1/f-t_2)$, then $Z_{eq}$ can be represented by a negative resistor (and therefore a source of power) and an inductor connected in parallel. In the second special case, the wireless power receiver 204 acts as power source and the wireless power receiver 204 can transfer energy back to the power transmitter 202. This can be useful, such as, if a wireless power receiver's battery is overcharged and needs to be at least partially discharged. Alternatively, backward power transfer can be useful, such as, for transferring power from a fully charged wireless power receiver to a discharged wireless power receiver. For example, the discharged wireless power receiver can drive switches Q1 and Q2 as if it was a power transmitter and the inductive coils of the two wireless power receivers can be placed in close proximity to each other to allow power transfer between them.

Figure 5:
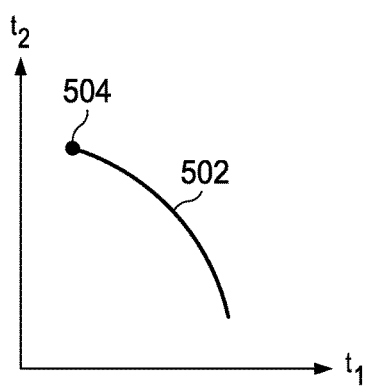
FIG. 5 is a graph of an example of control or optimization of two parameters as a function of two variable switching times.

FIG. 5 is a graph of an example of control and/or optimization of two separate parameters (control of current to the load and optimization of efficiency in the example of FIG. 5) as a function of two variable switching times ($t_1$ and $t_2$). The efficiency of a power receiver (power to the load $R_{load}$ divided by power input to the power receiver) is affected by numerous factors, some of which may vary over time and may vary with temperature. In the chart shown in FIG. 5, the X-axis is $t_1$, and the Y-axis is $t_2$. The line 502 represents a constant-current contour line. Accordingly, the current through the load $R_{load}$ is the same at all ($t_1$, $t_2$) points along line 502. Output power and input power can be measured and the efficiency can be computed for each ($t_1$, $t_2$) point on line 502. In the example of FIG. 5, the efficiency is highest at point 504. The particular values of $t_1$ and $t_2$ at point 504 provide a specified current to the load $R_{load}$ while also maximizing efficiency. Similarly, other parameters can be controlled or optimized, such as, output voltage, output power and receiver temperature.

Figure 6:
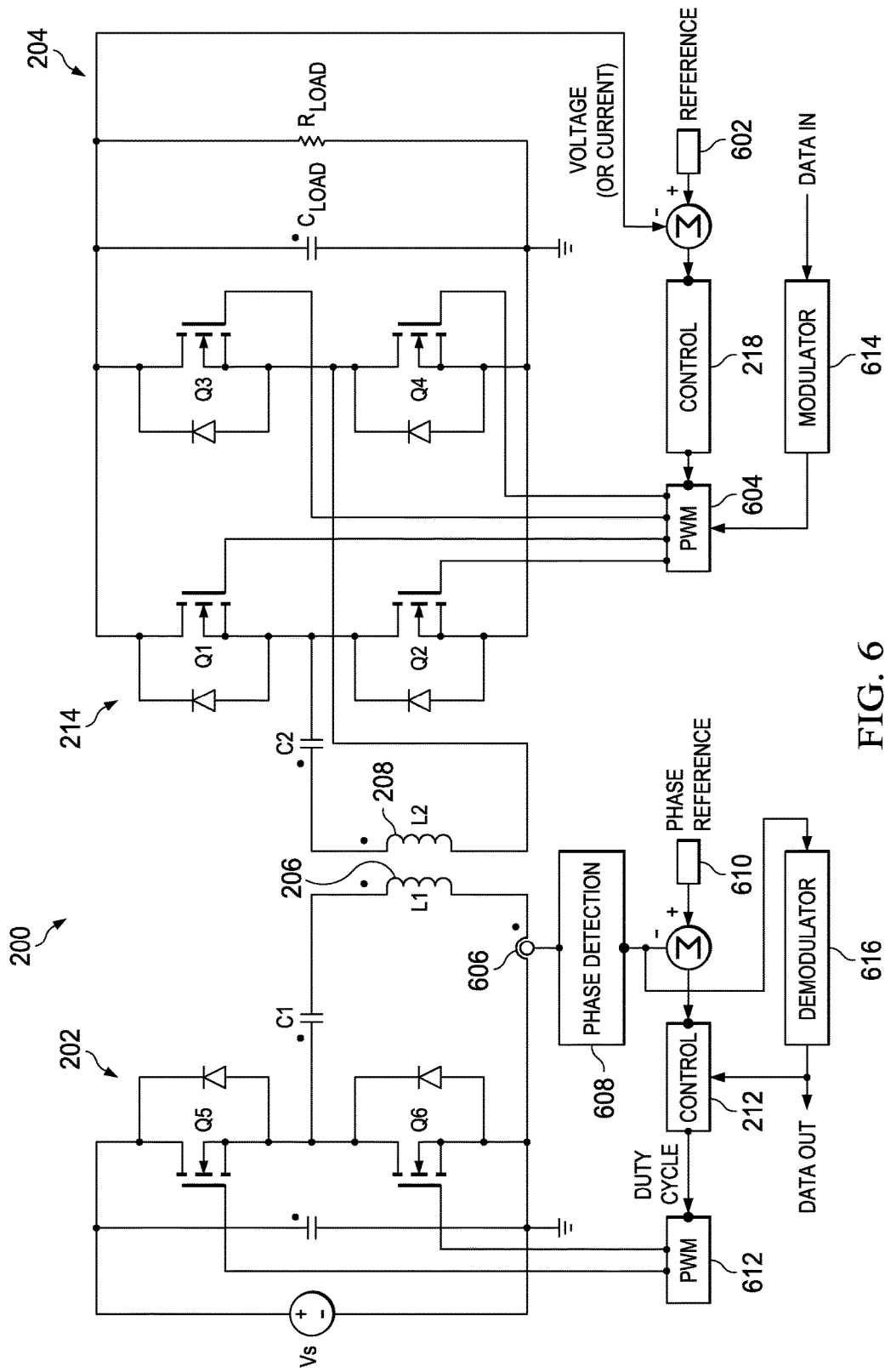
FIG. 6 is a schematic block diagram of a wireless power transfer system as in FIG. 2 with additional detail.

FIG. 6 is a schematic block diagram providing more detail for the wireless power transfer system 200 of FIG. 2. Reference numbers from FIG. 2 are retained in FIG. 6. In the example of FIG. 6, the power receiver 204 senses the voltage across the load $R_{load}$ (or the current through $R_{load}$), sums the voltage (or current) with a reference voltage (or current) 602, and the resulting voltage (or current) error signal drives a control circuitry 218. The control circuitry 218 sends control signals to a pulse-width-modulation (PWM) circuit 604 to adjust the times $t_1$, $t_2$, $t_3$, and $t_4$ for the adaptive rectifier 214, which in turn adjusts the power to the load $R_{load}$. The control circuitry 218 (discussed in more detail in conjunction with FIG. 7) can be implemented with a standard proportional-integral-derivative (PID), hysteretic, or other standard control techniques.

In the example of FIG. 6, the power transmitter 202 includes a resonant tank circuit (L1, C1) being driven at a fixed or variable frequency by electronic switches Q5 and Q6. In the example of FIG. 6, the reflected impedance from the adaptive rectifier 214 induces a phase shift in the primary coil 206. The primary current is sensed by a current sensor 606 (or by some other circuitry), current phase is detected by a phase detector 608, the phase of the current is summed with a phase reference 610, and the resulting phase error signal drives the control circuitry 212. The control circuitry 212 sends control signals to a PWM circuit 612 to adjust the duty-cycle (or frequency or other parameter) of Q5 and Q6, which in turn adjusts the power to the power receiver 204. The control circuitry 212 can be implemented with a standard PID, hysteretic, or other standard control techniques.

Control circuitry 212 may or may not exist in the power transmitter 202. The adaptive rectifier 214 can regulate the voltage (or current) to the load $R_{load}$ without a control module 212. However, control circuitry 212 can provide an additional control function that is useful to optimize power transfer. For example, control circuitry 212 can optimize system efficiency, or adjust the frequency of switches Q5 and Q6 to achieve zero-voltage switching operation, or implement safety functions (such as, reduction of magnetic field if a foreign metallic object is being overheated by eddy currents), or implement authentication functions, or provide flexibility to transmit power to multiple power receivers simultaneously.

Another benefit of a variable complex impedance is a capability of in-band communication. FIG. 6 also shows optional communication from the power receiver 204 to the power transmitter 202. Data can be modulated by a modulator 614 which can superimpose small perturbations (phase and/or amplitude) on the signal generated by the PWM circuitry 604, which in turn cause small perturbations of the input impedance $Z_{eq}$ of the adaptive rectifier 214. The reflected impedance perturbations from the adaptive rectifier 214 induce phase shifts in the primary coil 206, which are detected by the phase detector 608, and the resulting detected phase shifts are demodulated by a demodulator 616. An example industrial scientific medical (ISM) standard frequency is 6.78 MHz. The information data rate is limited to what can be encoded by modulation at the switching frequency, which may be a relatively low data rate compared to BLE, but the information data rate is more than adequate for the types of information sent from a wireless power receiver to a wireless power transmitter.

An additional benefit of the example of FIG. 6 is protection from transient voltage spikes or other overvoltage conditions. In a conventional wireless power receiver with a diode rectifier, the rectifier is subject to damage from transient voltage spikes or other overvoltage conditions caused by sudden power variations at the input to the rectifier. In contrast, the adaptive rectifier 214 can protect itself from over-voltage events by turning ON switches Q2 and Q4 any time the voltage across the load $R_{load}$ exceeds a first threshold. Switches Q2 and Q4 are then kept ON until the voltage across the load $R_{load}$ drops below a second lower threshold.

Figure 7:
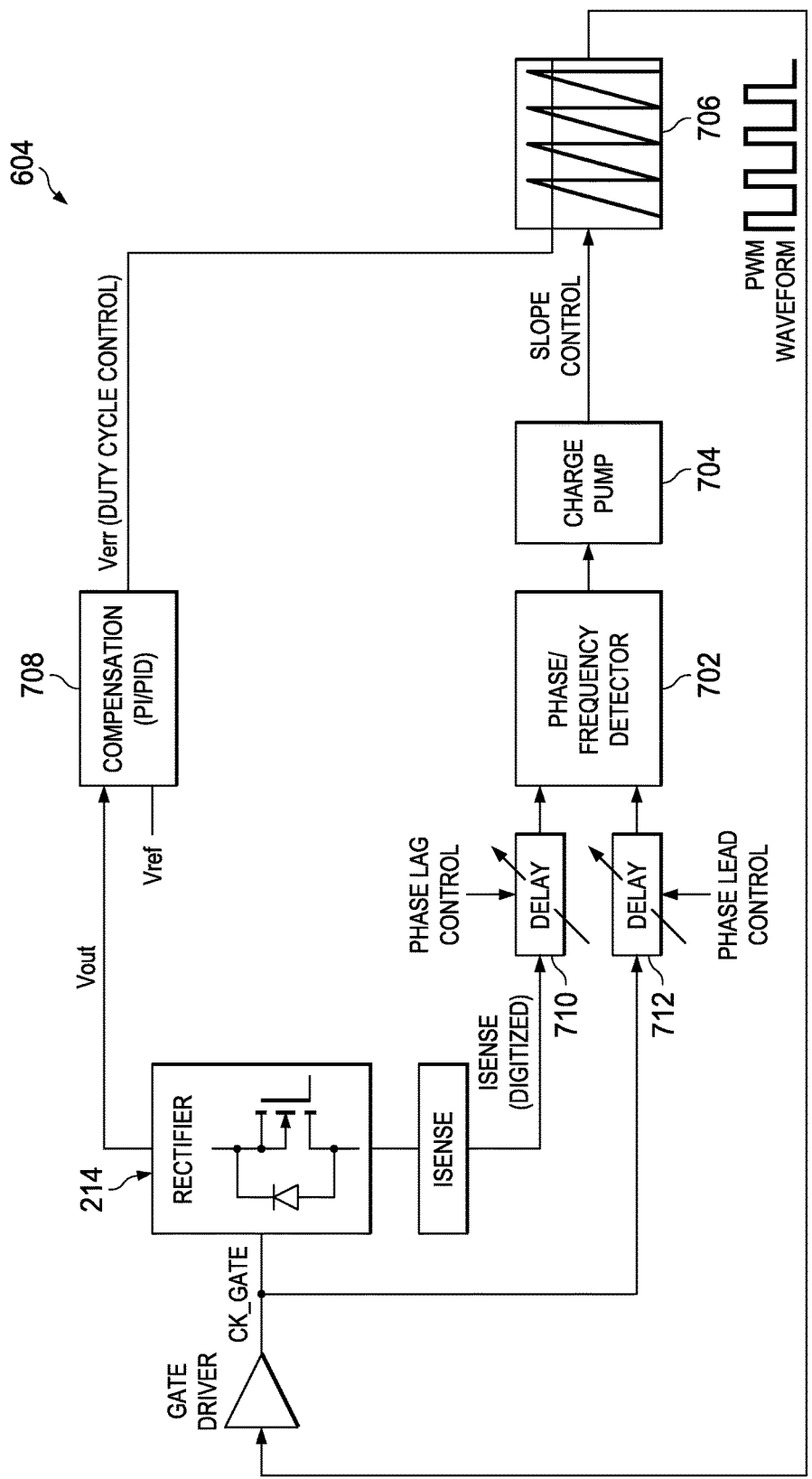
FIG. 7 is a schematic block diagram of additional detail for part of the wireless power receiver in FIG. 6.

FIG. 7 is a schematic block diagram illustrating additional example detail for the PWM module 604 in FIG. 6. For the example frequency of 6.78 MHz, the time for one-half period is 74 nsec. Accordingly, for the example frequency, the PWM module 604 precisely controls $t_1$ and $t_2$ within a 74 nsec window. In the example of FIG. 7, the voltage to the load is controlled by pulse width ($t_2-t_1$), and the phase of $t_1$ is separately controlled to enable adjustment of another parameter, such as, efficiency. In alternative embodiments, current to the load or power to the load can be controlled. In the example of FIG. 7, a phase/frequency detector 702 detects the voltage driving the gates of the transistor switches in the adaptive rectifier 214 and also detects the phase of the current through the switches. The phase/frequency detector 702 drives a charge pump 704 which determines the slope of a ramp generator 706. A compensation circuit 708 adjusts a threshold for the ramp generator 706 to adjust the width ($t_2-t_1$) of the resulting voltage pulses. Delay circuits 710 and 712 (controlled by the controller 218 in FIG. 6) then adjusts the timing of $t_1$ to enable adjustment of another parameter.

The circuit in FIG. 7 provides multiple advantages. One such advantage is that the propagation delay of the gate driver circuit (and any other undesirable fixed or variable propagation delays) is compensated by adjusting the slope of the ramp signal generated by the ramp generator 706. The ramp generator 706 generates a ramp signal of fixed amplitude but variable frequency. The frequency can be controlled by adjusting the slope of the ramp, which is achieved by adjusting the output of the charge pump 704. The charge pump block 704 adjusts the slope of the ramp generator 706 so the input signals to the phase/frequency detector 702 have the exact same frequency and phase. At the same time, the circuit of FIG. 7 generates a PWM waveform of variable duty cycle and phase. Duty cycle of the PWM waveform is set by comparing the saw-tooth signal generated by the ramp generator 706 with signal "Verr (duty cycle control)". The phase of the PWM waveform is set by adjusting the inputs to delay circuits 710 and 712. In particular, delay circuit 710 implements a phase lag and delay circuit 712 implements a phase lead of the PWM waveform.

Figures 8, 9:
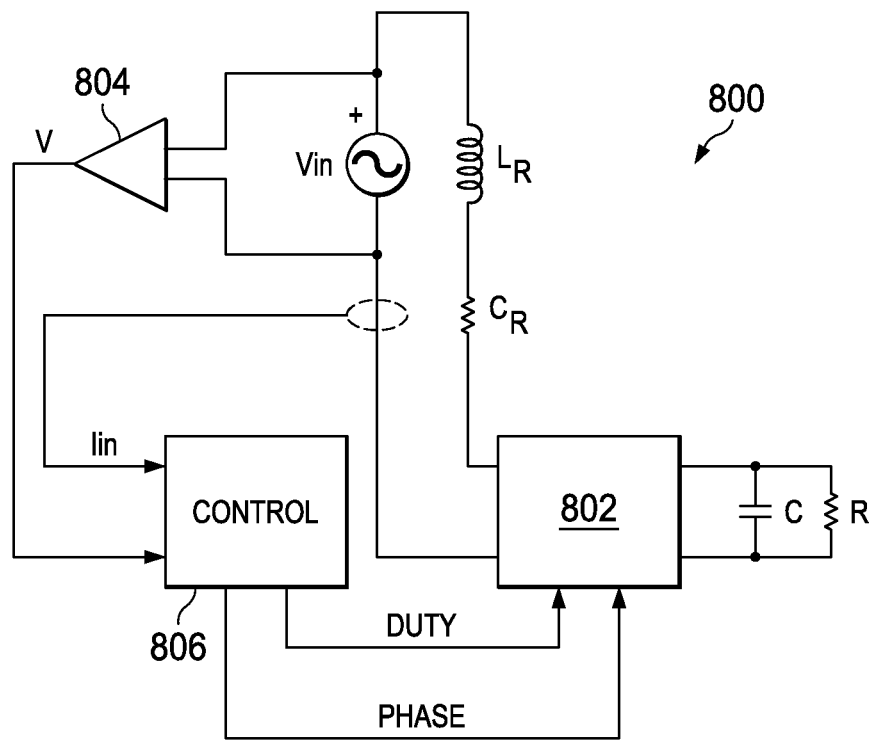
FIG. 8 is a schematic block diagram of an example embodiment of part of a resonant power circuit.
FIG. 9 is a flow chart of an example method of operating a wireless power transfer system.

FIG. 8 shows an alternative example function for an adaptive rectifier. FIG. 8 shows a generic resonant circuit 800, which includes an inductor $L_R$, capacitor $C_R$, and an adaptive rectifier 802. The resonant circuit 800 is part of a larger, more complex system, such as the wireless transmitter 202 in FIG. 6, and $L_R$ could be the transmitter coil 206 of the wireless power transmitter 202. Resonant circuits are generally sensitive to parameters of tolerance and drift so tuning of a resonant circuit to resonate at a precise frequency is difficult. But precise tuning such circuits to a certain frequency is often desirable. This sometimes results in selecting from low tolerance components, which may be expensive. In the example of FIG. 8 the adaptive rectifier 802 is used as an adjustable reactive element to dynamically tune the resonance frequency of the circuit to a specific value. In the example of FIG. 8, the input voltage $V_{in}$ is sensed by an amplifier 804 and the resulting signal V is compared with current $I_{in}$ to detect the phase difference between the input voltage and current of the resonant circuit. A controller 806 adjusts the duty cycle and the phase of the adaptive rectifier 802 to dynamically regulate the phase between signals V and I to a precise value. In particular, the input impedance of the adaptive rectifier 802 will enable the resonant circuit (including $L_R$ and $C_R$ and the adaptive rectifier block 214) to resonate at a very specific frequency. This technique is useful for a variety of purposes, such as efficiency optimization, frequency adaptation, power maximization and in-band communication signaling. The capacitor C and the resistor R at the output of the adaptive rectifier 802 can assume values dependent on the specific application and one or the other may not exist. Furthermore an inductor or any other element is connectable to the output of the adaptive rectifier 802 for a specific application.

FIG. 9 is a flow chart of a method 900 of controlling the wireless power transfer system 200. At step 902, control circuitry 218 in the wireless power receiver 204 controls switches in the rectifier 214 for ensuring complex impedance at the input impedance of the rectifier.

Modifications are possible in the described embodiments, and other embodiments are possible, within the scope of the claims.

What is claimed is:

1. A wireless power transfer system, comprising:
  a wireless power receiver including: a rectifier including switches and a rectifier input having first and second rectifier input nodes; a secondary coil having a first terminal coupled to the first rectifier input node, and having a second terminal coupled to the second rectifier input node; and control circuitry to control the switches, including varying states of the switches to ensure a complex impedance at the rectifier input by shifting a phase of a voltage between the first and second rectifier input nodes relative to a phase of the secondary coil.

2. The wireless power transfer system of claim 1, wherein the control circuitry is configured to control the switches to ensure the complex impedance with variable phase into the rectifier.

3. The wireless power transfer system of claim 2, wherein the control circuitry is configured to control an output pulse width for control of a first parameter and to control a phase of the output pulse to adjust a second parameter.

4. The wireless power transfer system of claim 3, wherein the first parameter is output current to a load, and the second parameter is efficiency of the wireless power receiver.

5. The wireless power transfer system of claim 3, wherein the first parameter is voltage to a load, and the second parameter is efficiency of the wireless power receiver.

6. The wireless power transfer system of claim 2, wherein the control circuitry is configured to control a phase of the complex impedance at the rectifier input, so that a resistance of the rectifier input is negative.

7. The wireless power transfer system of claim 6, wherein the wireless power receiver is configured to transfer power to a wireless power transmitter when the resistance of the input to the rectifier is negative.

8. The wireless power transfer system of claim 1, further comprising:
  a wireless power transmitter configured to: sense current phase changes resulting from reflected impedance of the rectifier in the wireless power receiver; and control a parameter in the wireless power transmitter in response to the reflected impedance of the rectifier in the wireless power receiver.

9. The wireless power transfer system of claim 1, wherein the complex impedance is a variable impedance, and the wireless power receiver is configured to encode information in the variable impedance at the rectifier input.

10. The wireless power transfer system of claim 9, further comprising:
  a wireless power transmitter configured to: sense changes in the variable impedance reflected from the wireless power receiver; and decode information encoded in the changes.

11. The wireless power transfer system of claim 1, wherein the control circuitry is configured to control the switches in the rectifier to at least partially discharge a voltage at an output of the rectifier, for preventing a magnitude of that voltage from exceeding a maximum value.

12. A method of controlling a wireless power transfer system, the method comprising:
  controlling, by control circuitry in a wireless power receiver, switches in a rectifier that includes a rectifier input having first and second rectifier input nodes, wherein controlling the switches includes varying states of the switches to ensure a complex impedance at the rectifier input by shifting a phase of a voltage between the first and second rectifier input nodes relative to a phase of a secondary coil, the secondary coil having a first terminal coupled to the first rectifier input node, and having a second terminal coupled to the second rectifier input node.

13. The method of claim 12, further comprising:
controlling, by the control circuitry in the wireless power receiver, the switches in the rectifier to control two different operating parameters of the wireless receiver.

14. The method of claim 12, further comprising:
controlling, by the control circuitry in the wireless power receiver, the switches in the rectifier to control a phase of the complex impedance at the rectifier input, so that a resistance of the rectifier input is negative.

15. The method of claim 14, further comprising:
wirelessly transferring, by the wireless power receiver, power to a wireless power transmitter.

16. The method of claim 12, wherein the complex impedance is a variable impedance, and the method further comprises:
encoding, by the wireless power receiver, information in the variable impedance at the rectifier input.

17. The method of claim 16, further comprising:
sensing, by a wireless power transmitter, changes in the variable impedance reflected from the wireless power receiver; and
decoding, by the wireless power transmitter, information encoded in the changes.

18. The method of claim 12, further comprising:
controlling, by the control circuitry in the wireless power receiver, the switches in the rectifier to at least partially discharge a voltage at an output of the rectifier, for preventing a magnitude of that voltage from exceeding a maximum value.

\* \* \* \* \*